(No Model.)
H. H. HOLMES.
SUPPORT.
No. 531,998. Patented Jan. 1, 1895.
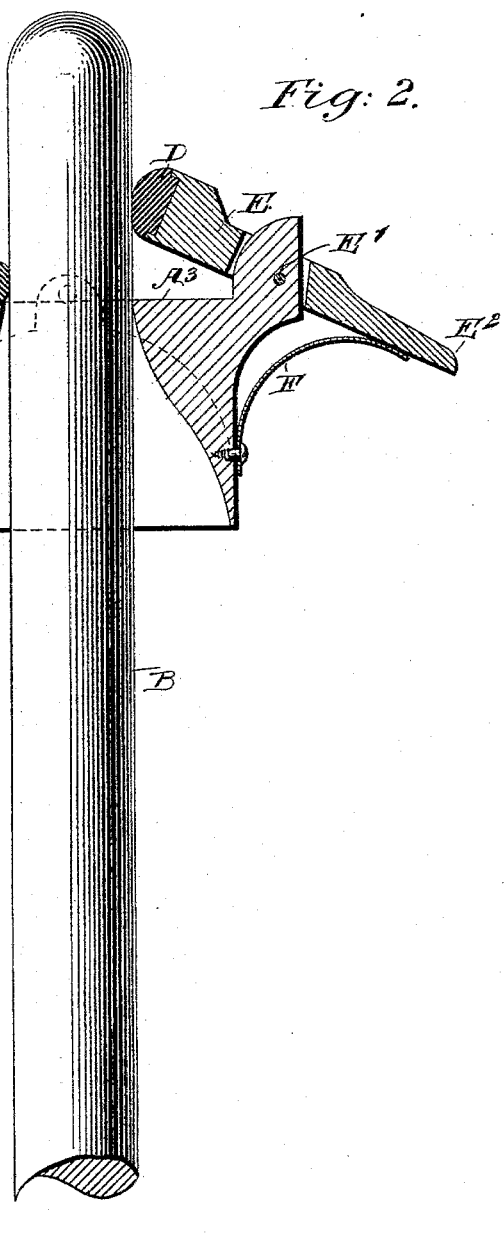
WITNESSES:
John A. Rennie
Theo. G. Hoster
INVENTOR
H. H. Holmes
BY
Munn & Co.
ATTORNEYS.

UNITED STATES PATENT OFFICE.

HENRY H. HOLMES, OF COUNCIL BLUFFS, IOWA, ASSIGNOR OF TWO-THIRDS TO GEORGE METCALF AND JAMES M. DUNGAN, OF SAME PLACE.

SUPPORT.

SPECIFICATION forming part of Letters Patent No. 531,998, dated January 1, 1895.

Application filed April 4, 1894. Serial No. 506,320. (No model.)

*To all whom it may concern:*

Be it known that I, HENRY H. HOLMES, of Council Bluffs, in the county of Pottawattamie and State of Iowa, have invented a new and Improved Mop and Broom Holder, of which the following is a full, clear, and exact description.

The object of the invention is to provide a new and improved holder, which is simple and durable in construction, and more especially designed for conveniently supporting and holding brooms, mops and other articles.

The invention consists of certain parts and details, and combinations of the same, as will be hereinafter described and then pointed out in the claim.

Reference is to be had to the accompanying drawings, forming a part of this specification, in which similar letters of reference indicate corresponding parts in both the figures.

Figure 1 is a perspective view of the improvement with a broom or mop handle in position; and Fig. 2 is an enlarged sectional side elevation of the same.

The improved holder is provided with a casing A, preferably made bell-shaped and having a passage A', for the handle B, or other part of the article to be supported and held in place. On the casing A is arranged a socket A², supporting a flexible abutment C, made of rubber or other similar material, the said abutment projecting over the opening or passage A', so as to engage one side of the handle B. The latter is engaged at its side by a tip D made of flexible material such as rubber and held in a socket on the inner end of a lever E fulcrumed at E' on the casing and provided on its outer end with a handle E² under the control of the operator.

A spring F secured on the casing presses the handle end E² of the lever E so as to normally hold the inner end of the said lever on a lug A³ formed on the casing A. The rear side of the casing A is preferably flattened and is formed with an eye F' for conveniently fastening the holder by a nail or other means to a wall or other suitable support. Now, when the holder is in place and it is desired to support, say a broom in the said holder, then the handle end of the broom is passed through the flaring bell-shaped mouth of the casing upward through the passage A', so as to strike the projecting tip D, thereby lifting the inner end of the lever E, and when the operator now releases the handle of the broom, then the spring F of the lever E will force the tip end of the lever downward, and the said tip in firm contact with the broom handle, so as to securely clamp the latter in place in the casing between the abutment C and the tip D.

When it is desired to release the broom handle, the operator simply presses on the handle E² of the lever E, so as to move the tip D out of contact with the handle, the latter then readily passing downward by its own weight to finally disengage the casing A. The casing A is preferably made bell-shaped, as shown in the drawings, so that the handle end can be readily passed into the casing.

It will be seen that this device is very simple and durable in construction, can be cheaply manufactured, takes up very little room and securely holds the article in place.

Having thus fully described my invention, I claim as new and desire to secure by Letters Patent—

As an improved article of manufacture, a broom holder consisting in the bell shape case A having an attaching means, a flaring opening A', a socket A² on the upper edge of the casing, a flexible abutment C mounted in said socket and overhanging the upper end of said opening a lever E pivoted between its ends on the upper side of the casing with its inner socketed end normally resting on the casing as at A³, a tip D in said socketed end, and a spring pressing the outer end of the lever upwardly, substantially as described.

HENRY H. HOLMES.

Witnesses:
HERBERT F. FIELD,
LE PAUL DUNGAN.